United States Patent
Japp et al.

(10) Patent No.: US 6,734,259 B1
(45) Date of Patent: May 11, 2004

(54) RESIN COMPOSITION WITH A POLYMERIZING AGENT AND METHOD OF MANUFACTURING PREPREG AND OTHER LAMINATE STRUCTURES THEREFROM

(75) Inventors: Robert M. Japp, Vestal, NY (US); Konstantinos I. Papathomas, Endicott, NY (US); Cory J. Ruud, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/281,038

(22) Filed: Oct. 24, 2002

(51) Int. Cl.⁷ ............................................. C08F 283/08
(52) U.S. Cl. ..................... 525/391; 525/132; 528/205; 524/611
(58) Field of Search ................................ 525/341, 132; 528/205; 524/611

(56) References Cited

U.S. PATENT DOCUMENTS

| | | | |
|---|---|---|---|
| 4,052,543 A | 10/1977 | McKellin et al. | 526/45 |
| 4,824,883 A | 4/1989 | Walters et al. | 524/93 |
| 5,237,108 A | 8/1993 | Marraccini et al. | 568/615 |
| 5,258,465 A | 11/1993 | Suyama et al. | 525/263 |
| 5,352,745 A | 10/1994 | Katayose et al. | 525/391 |
| 5,760,149 A | 6/1998 | Sanchez et al. | 526/230.5 |
| 5,821,305 A | 10/1998 | Schutyser et al. | 525/112 |
| 6,197,898 B1 | 3/2001 | van den Berg et al. | 525/523 |
| 6,254,971 B1 | 7/2001 | Katayose et al. | 428/209 |
| 6,306,963 B1 | 10/2001 | Lane et al. | 525/68 |
| 6,352,782 B2 | 3/2002 | Yeager et al. | 428/461 |

OTHER PUBLICATIONS

"Reactive Polymers" by H. J. Adler et al, Copyright 2000–2002, John Wiley & Sons, Ltd., pp. 1–3.

Primary Examiner—Patricia A. Short
(74) Attorney, Agent, or Firm—William N. Hogg

(57) ABSTRACT

A prepreg resin comprising:
(a) 98 to 40% by weight based on the total weight of components (a) and (b), of a curable polyphenylene ether resin;
(b) 2 to 60% by weight based on the total weight of components (a) and (b), of at least one cyanurate selected from the group consisting of triallyl isocyanurate and triallyl cyanurate;
(c) a polymerization initiator comprised of a peroxide functionalized polymer, said peroxide functionalized polymer being fragmented by heat to a plurality of free radical moieties, such as t-butoxide moieties, and a relatively inert moiety having a molecular weight greater than about 1,000.

The invention also encompasses a cured resin either as a coating on a substrate, without fiberglass cloth embedded, or a cured prepreg with fiberglass cloth embedded and a method of forming the same.

18 Claims, 3 Drawing Sheets

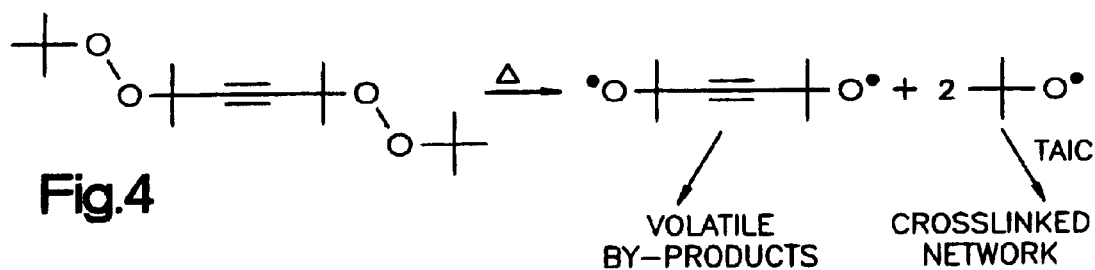
Fig.4
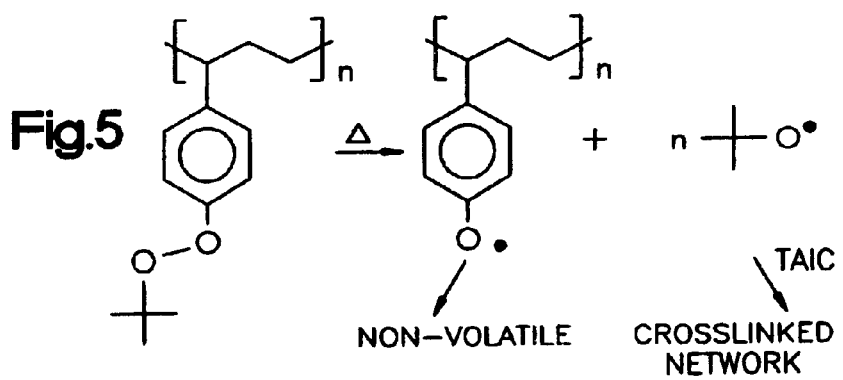
Fig.5
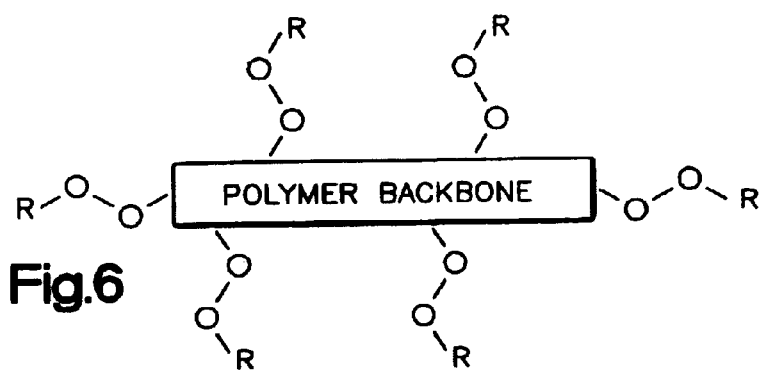
Fig.6
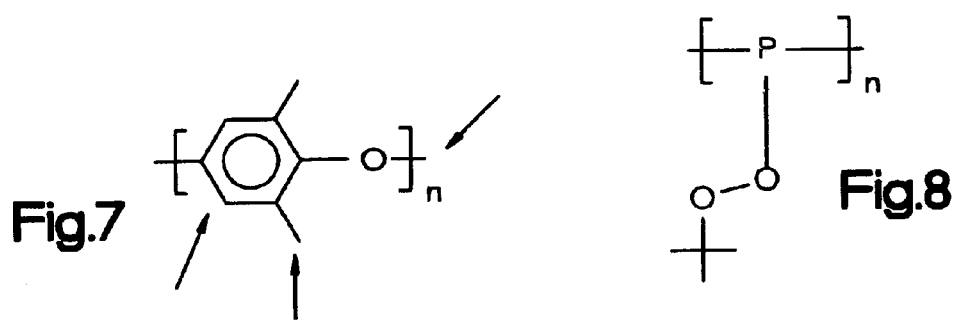
Fig.7
Fig.8

RESIN COMPOSITION WITH A POLYMERIZING AGENT AND METHOD OF MANUFACTURING PREPREG AND OTHER LAMINATE STRUCTURES THEREFROM

FIELD OF THE INVENTION

This invention relates generally to a composition of matter in which resins are polymerizable using polymerizing agents and, more particularly, to compositions that are especially adapted for polyphenylene ether (PPE) and modified PPE resin formulations. These compositions are made into prepreg dielectric sheets or coated on a substrate and cured to form dielectric laminate structures for circuit packaging structures.

BACKGROUND OF THE INVENTION

Background Information

One conventional technique for forming laminate circuit structures is to provide a sheet of what is referred to as prepreg, which is glass cloth impregnated with a resin solution which subsequently is either dried or partially cured. Also, a similar type of resin is sometimes used without the glass cloth and coated onto metal, such as copper, for use as build up layers. These are commonly referred to as resin coated copper (RCC) or polymer coated copper (PCC). Such prepregs are then laminated with copper foils forming cores. Cores are then processed further, such as forming vias and circuitry thereon, and then laminated with additional prepregs and copper foils to form a composite laminate structure. Particularly useful resins for forming prepregs are described in U.S. Pat. No. 6,352,782 B2, often referred to as PPE, assigned to General Electric Company, hereinafter sometimes referred to as the GE patent, and in U.S. Pat. No. 5,352,745, often referred to as the modified PPE or APPE, assigned to Asahi Kasei Kogyo Kabushiki Kaisha of Tokyo, Japan, sometimes hereinafter referred to as the Asahi patent. Both of these patents are incorporated herein by reference. The PPE resin as described in the GE patent is a reactively end capped poly(phenylene ether) compound cured with certain unsaturated compounds for synthesizing resins ideally adapted for impregnating fibrous reinforcement in the manufacture of circuit boards. The PPE is described in the Asahi patent as a curable polyphenylene ether resin composition comprising a reaction product obtained by reacting a polyphenylene ether with an unsaturated carboxylic acid or an acid anhydride and at least one cyanurate. Generally speaking, these compositions include about 98% to about 40% by weight of a curable polyphenylene ether resin comprising a reaction product obtained by reacting a polyphenylene ether with an unsaturated carboxylic acid or an acid anhydride, and 2% to 60% by weight, based on the total weight of this and the previous components, of at least one cyanurate selected from the group consisting of triallyl isocyanurate and triallyl cyanurate. These compositions include an initiator. Generally speaking, the initiator is a peroxide of a low molecular weight compound, i.e. below about 700 grams per mole. These peroxides are described in the Asahi patent in column 13, lines 10–23, and in the GE patent, column 12, lines 19–28. An earlier PPE composition is described in U.S. Pat. No. 5,218,030, assigned to Asahi Kasei Kogyo Kabushiki Kaisha of Tokyo, Japan. It describes the use of poly (phenylene ether) containing pendant allyl or propargyl groups, triallylcyanurate or triallylisocyanurate, and optionally an antimony-containing flame retardant. Other formulations replace the antimony flame retardant with bromine containing compounds.

Several problems have been encountered when using the PPE or modified PPE compositions incorporating low molecular weight initiators. (Hereinafter, the term PPE may be used for both PPE and modified PPE.) First, one problem is that the prepreg has component volatility characterized by the volatilization of the low molecular weight peroxide initiators. Second, following lamination, there is a marked out-gassing which has been attributed to the breakdown components of the low molecular weight initiator that do not enter into the reaction and are trapped in the matrix and outgas upon lamination and, third, the inability to laminate the material after the prepreg has been exposed to wet processing. It is believed that this is due to the fact that the low molecular weight initiator is driven off when the prepreg is heated to remove any absorbed water. The first and third of these conditions result in poor cross linking and, thus, degraded material and final structure properties, and the second of these conditions results in a propensity to delamination of the cured prepreg layers. These are problems that need to be solved to improve the commercial viability of the currently available PPE and APPE products.

SUMMARY OF THE INVENTION

A prepreg resin comprising:
(a) 98 to 40% by weight based on the total weight of components (a) and (b), of a curable polyphenylene ether resin;
(b) 2 to 60% by weight based on the total weight of components (a) and (b), of at least one cyanurate selected from the group consisting of triallyl isocyanurate and triallyl cyanurate;
(c) a polymerization initiator comprised of a peroxide functionalized polymer, said peroxide functionalized polymer being fragmented by heat to a plurality of free radical moieties, such as t-butoxide moieties, and a relatively inert moiety having a molecular weight greater than about 1,000.

The invention also encompasses a cured resin ether as a coating on a substrate, without fiberglass cloth embedded, or a cured prepreg with fiberglass cloth embedded and a method of forming the same, and an electronic packaging structure.

DESCRIPTION OF THE DRAWINGS

FIG. 4 shows a representation of the decomposition of a prior art low molecular weight peroxide initiator, forming a reactive initiator species and volatile by-products;

FIG. 5 is a diagram showing the breakdown of the high molecular weight polyperoxide initiator according to the present invention;

FIG. 6 is a representation of a functionalized polymer backbone incorporating peroxide groups as side chains or end groups according to the present invention;

FIG. 7 depicts the chemical structure of poly(phenylene ether). It can be functionalized with peroxide groups at three possible sites: end groups, methyl groups, or on the aromatic ring as the arrows depict.

FIG. 8 is the chemical structure depicting a generalization of a peroxidized polymer (P). The R could be, but not limited to, H or t-butyl groups.

DESCRIPTION OF THE PREFERRED EMBODIMENTS

Before describing the preferred embodiments of the invention in detail, a brief review of the prior art and the cause for its shortcomings are set forth below.

Figure 1:
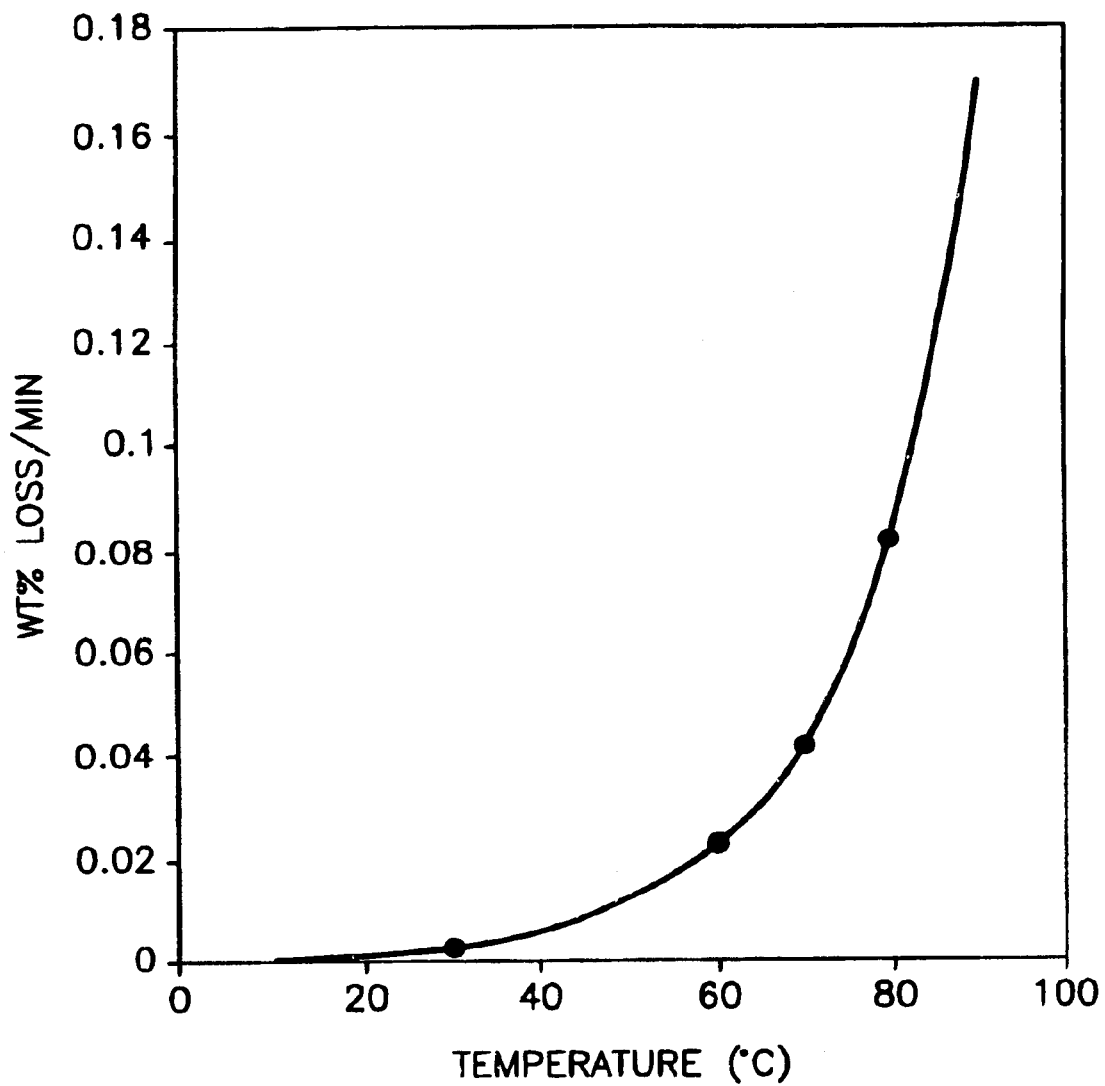
FIG. 1 is a graph showing the weight loss per minute of an APPE prepreg composition heated to various temperatures.

FIG. 1 shows the rate of weight loss of a commercially available PPE prepreg that contains a crosslinking agent, a polyphenylene ether resin, a brominated flame retardant and a peroxide initiator. As can be seen, heating at various temperatures up to 80° C. results in an appreciable amount of weight loss per minute. The most volatile component emitted from the prepreg was identified as the peroxide initiator by gas chromatography/mass spectrometry (GC/MS) analysis.

Figure 2:
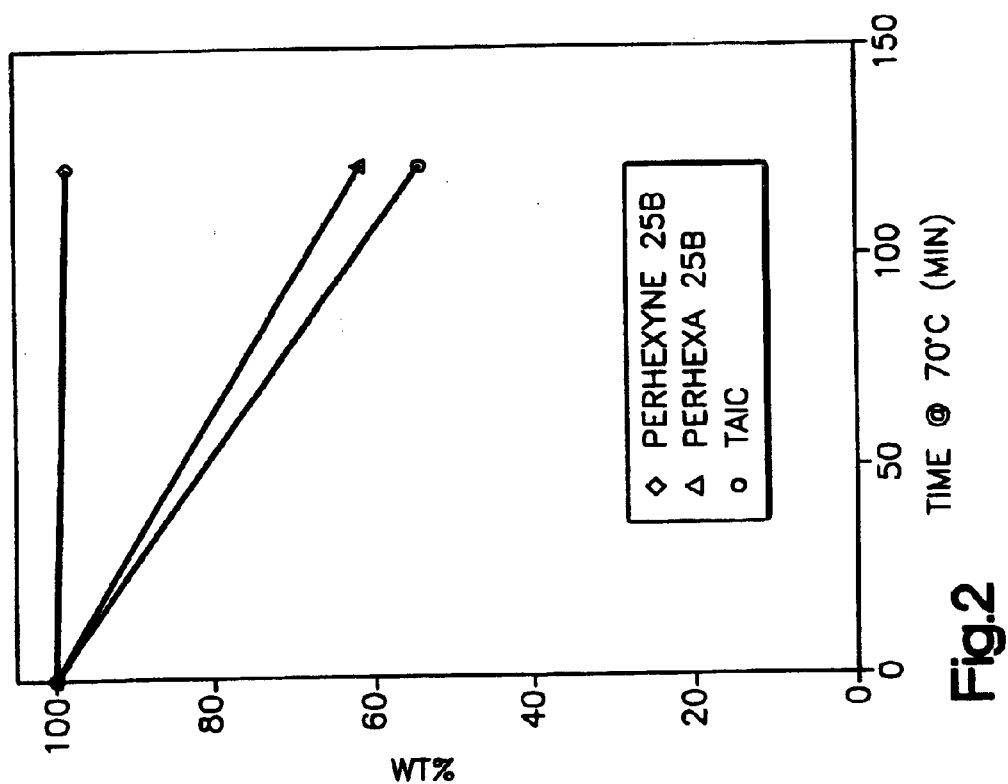
FIG. 2 is a graph of the resulting weight loss of some of the individual components when heated at 70° C. for various time periods.

FIG. 2 shows the volatility of some of the individual resin compounds of the prior art PPE composition. These compounds are found in S-2122 prepreg and in resin coated copper PC-5103, both sold by Asahi Kasei Kogyo Kabushiki Kaisha of Tokyo, Japan. Similar components are found in a product designated as N-6000 sold by Neltec, Inc. of Tempe, Arizona. The crosslinking agent is TAIC (triallyl isocyanurate), although triallyl cyanurate could also be used. Perhexa 25B refers to 2,5-dimethyl-2,5-di(t-butylperoxy)-hexane and Perhexyne 25B refers to 2,5-dimethyl-2,5-di(t-butylperoxy)-3-hexyne, both peroxide initiators. These two initiators, described in the Asahi patent, were identified in the volatile emissions from commercially available prepregs licensed by Asahi via GC/MS analysis. The use of cross linking agents and initiators is well known in the art and described in detail in the above GE and Asahi patents, and need not be described in detail. Suffice it to say that the initiator plays a significant part in the effectiveness of the cross linking agent.

As can be seen in FIG. 2, heating at 70° C. for any period of time does not result in any significant weight loss of the TAIC. However, such heating does reduce the weight percent of both the Perhexa 25B and Perhexyne 25B peroxide initiators significantly. As a matter of fact, heating just over 100 minutes and less than 150 minutes at 70° C. gives somewhere around a 60% weight loss of these initiators. Thus, these individual components are relatively volatile.

Figure 3:
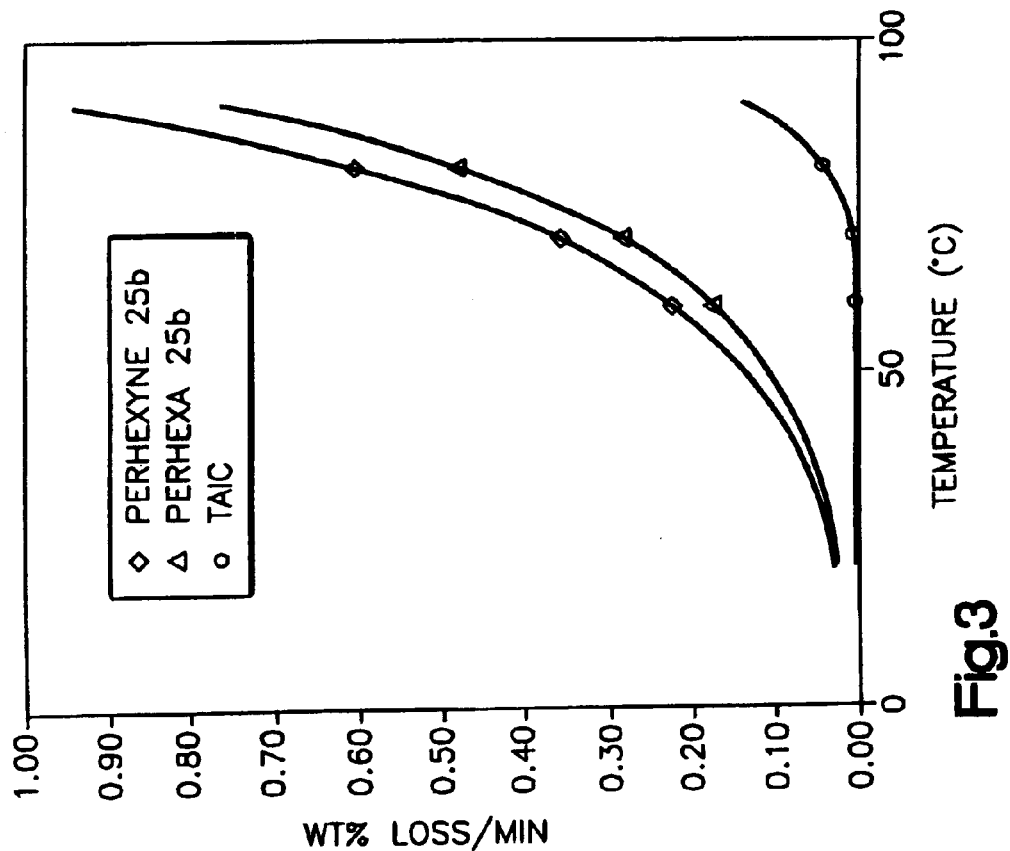
FIG. 3 is a graph showing the rate of weight loss of some of the individual components of PPE resin composition when heated to various temperatures.

In FIG. 3, the same designations apply and, in this case, the rate of weight loss at various temperatures is shown. As can be seen in FIG. 3, even the TAIC has some weight loss as temperatures increase, although the Perhexa 25B and Perhexyne 25B peroxide initiators have much more significant losses per minute at elevated temperatures, indicating the volatility of these compounds.

These three figures together show that there is significant weight loss from a prepreg material which contains low molecular weight peroxide initiators. It is believed that this weight loss is due to the volatility of the initiators which causes decreased effectiveness of the initiators, resulting in the decreased performance characteristics described above, i.e. that the volatility of this component is significant and, thus, the prepreg will not properly cure during lamination. Indeed, it has been found that, even at room temperature, the evaporation of these necessary components is significant and, thus, the resulting products are often improperly cured, resulting in low $T_g$, excessive flow, and variable coefficient of thermal expansion (CTE). Also, the same result may occur if the prepreg is subjected to any water during the processing, requiring subsequent removal of the water prior to final cure and lamination. In heating or vacuum drying to remove the water, the initiator is driven off since it evaporates at a lower temperature than the water. This results in a poor or improper laminate structure.

The third problem, as mentioned above, results from the out-gassing of the initiator decomposition by-products. This is depicted in FIG. 4 where it is shown that, upon the application of heat, the initiator, either the Perhexa 25B or Perhexyne 25B (shown in FIG. 4), decomposes into two distinct products; one is the active t-butoxide radical which initiates the cross linking of the TAIC and the other is a less reactive low molecular weight by-product which does not enter into the reaction and, thus, is left unreacted in the matrix. Upon heating, these volatile by-products tend to out gas from the laminate structure which has been shown to cause blistering in printed circuit boards exposed to infrared or other reflow conditions. These volatiles have been identified by head space and GC/MS analysis. Thus, it is an object of this invention to provide an initiator which overcomes these prior art problems in forming stable PPE resin composition prepreg and laminated structures.

According to the present invention, a high molecular weight polyperoxide material is provided as an initiator in a curable polyphenylene ether resin composition which includes a curable polyphenylene ether resin and at least one cyanurate selected from the group consisting of triallyl isocyanurate and triallyl cyanurate as a cross linking agent. The high molecular weight polyperoxide has a molecular weight in excess of 1,000 and preferably in excess of 3,000. A particularly useful polyperoxide initiator, a polyperoxide functionalized polystyrene, is shown in FIG. 5 with the decomposition products thereof. The particular peroxidized polystyrene has a molecular weight in excess of 1,000 and preferably in excess of 3,000. Conventional processing conditions include evaporating the solvent at between about 50° C. and 120° C., and then curing at about 200° C. for about two hours, at about 200 psi to about 1,000 psi. (It is to be understood that these are just some of the conditions that can be used to cure the resin. Many others are possible.)

Under heat, the peroxidized polystyrene breaks down to the products shown in the equation of FIG. 5, i.e. a number of active t-butoxide moieties which will react with the TAIC to promote cross linking, and certain high molecular weight, nonvolatile components, e.g. above about 1,000 and preferably above about 3,000. The non-volatile components also should not interfere with the electrical or mechanical properties of the cured resin; i.e. the properties of the cured resin should not differ significantly from those described in the Asahi or GE patents. Thus, the original peroxidized polystyrene will not be subject to any significant evaporation from the PPE composition, nor will it evaporate to any significant extent if the composition is exposed to water and the water is subsequently dried; moreover, under baking, the by-product will not volatilize because of its high molecular weight. Thus, by using a high molecular weight polyperoxide, the three major problems encountered with the prior art initiators in the PPE resin system have been overcome.

In the preferred aspect of the present invention, there is (a) 98% to 40% by weight based on the total weight of components (a) and (b) of a curable polyphenylene ether resin, preferably comprising a reaction product obtained by reacting a polyphenylene ether with an unsaturated carboxylic acid or an acid anhydride; (b) 2% to 60% by weight based on a total weight of the components (a) and (b) of at least one cyanurate selected from the group consisting of triallyl isocyanurate and triallyl cyanurate. Other components may optionally be added as described in the Asahi and GE patents, such as an epoxy resin and a curing agent to which an initiator is added, preferably from about 0.1 to about 10 parts by weight and, more preferably, from 0.1 to 8 parts by weight based on 100 parts by weight of the total amount of the components (a) and (b). These compositions may also contain filler materials, such as silica. The initiator is a high molecular weight, peroxide functionalized polymer having a molecular weight in excess of 1,000 and preferably in excess of 3,000. Preferably, the polyperoxide is a peroxidized polystyrene.

FIG. 6 depicts a general structure of a peroxide functionalized polymer that can be used. A polymer can be functionalized to incorporate peroxide groups in pendant side chains or at the end groups. FIG. 7 depicts at which sites a poly(phenylene ether) backbone can be reacted. FIG. 8 is a generalized polymer structure that has been functionalized with peroxide groups. These particular polymers could be polystyrene, as indicated above, or polyphenylene ether, polyethylene, polypropylene, polybutylene, and polymethacrylate. Other polymers that are thermally stable, exhibit reasonably low dielectric properties, and are relatively hydrophobic in nature could also be employed within the scope of the present invention.

As shown in FIGS. 7 and 8, these poly functionalized structures will break at the oxygen-to-oxygen bond and provide the active radical moiety, such as t-butoxide, to initiate polymerization, and the remaining inert moiety which has a molecular weight greater than about 1,000.

The particular resin and initiator described herein can be either manufactured into prepreg or resin coated copper with improved storage and handling behavior. These materials are then processed in a conventional manner resulting in low dielectric, highly stable, hydrophobic laminated electronic packaging structures, such as printed circuit boards and laminate chip carriers, that do not suffer from out gassing during curing or later heating operations.

What is claimed is:

1. A resin comprising:
    (a) 98 to 40% by weight based on the total weight of components (a) and (b), of a curable polyphenylene ether resin;
    (b) 2 to 60% by weight based on the total weight of components (a) and (b), of at least one cyanurate selected from the group consisting of triallyl isocyanurate and triallyl cyanurate;
    (c) a polymerization initiator comprised of a peroxide functionalized polymer, said peroxide functionalized polymer being broken down by heat to a plurality of free radical moieties, and a relatively inert moiety having a molecular weight greater than about 1,000.

2. The invention as defined in claim 1 wherein said free radical moieties include t-butoxide.

3. The invention as defined in claim 1 wherein said peroxide functionalized polymer is selected from the group polystyrene, polyphenylene ether, polyethylene, polypropylene, polybutylene, and polymethacrylate.

4. A cured resin comprising the reaction product of a resin comprising:
    (a) 98 to 40% by weight based on the total weight of components (a) and (b), of a curable polyphenylene ether resin;
    (b) 2 to 60% by weight based on the total weight of components (a) and (b), of at least one cyanurate selected from the group consisting of triallyl isocyanurate and triallyl cyanurate;
    (c) a polymerization initiator comprised of a peroxide functionalized polymer, said peroxide functionalized polymer being broken down by heat to a plurality of free radical moieties, and a relatively inert moiety having a molecular weight greater than about 1,000.

5. The invention as defined in claim 4 wherein said free radical moieties include t-butoxide.

6. The invention as defined in claim 4 wherein said peroxide functionalized polymer is selected from the group polystyrene, polyphenylene ether, polyethylene, polypropylene, polybutylene, and polymethacrylate.

7. The invention as defined in claim 4 wherein a fiberglass cloth is disposed in said cured resin.

8. The invention as defined in claim 7 wherein said free radical moieties include, but are not limited, to t-butoxides and hydroperoxides.

9. The invention as defined in claim 7 wherein said peroxide functionalized polymer is selected from the group polystyrene, polyphenylene ether, polyethylene, polypropylene, polybutylene, and polymethacrylate.

10. The invention as defined in claim 4 wherein said cured resin is coated on a substrate.

11. The invention as defined in claim 10 wherein said free radical moieties include t-butoxide.

12. The invention as defined in claim 10 wherein said peroxide functionalized polymer is selected from the group polystyrene, polyphenylene ether, polyethylene, polypropylene, polybutylene, and polymethacrylate.

13. A method of forming a cured resin structure comprising the steps of:
    (1) providing a resin comprising:
        (a) 98 to 40% by weight based on the total weight of components (a) and (b), of a curable polyphenylene ether resin;
        (b) 2 to 60% by weight based on the total weight of components (a) and (b), of at least one cyanurate selected from the group consisting of triallyl isocyanurate and triallyl cyanurate;
        (c) a polymerization initiator comprised of a peroxide functionalized polymer, said peroxide functionalized polymer being broken down by heat to a plurality of free radical moieties, and a relatively inert moiety having a molecular weight greater than about 1,000; and
    (2) curing said resin.

14. The invention as defined in claim 13 wherein said free radical moieties include t-butoxide.

15. The invention as defined in claim 13 wherein said peroxide functionalized polymer is selected from the group polystyrene, polyphenylene ether, polyethylene, polypropylene, polybutylene, and polymethacrylate.

16. The invention as defined in claim 13 wherein said resin provides a fiberglass cloth.

17. The invention as defined in claim 13 further comprising the step of coating the resin on a substrate prior to curing.

18. The method according to claim 13 wherein an electronic packaging structure is formed.

* * * * *